A. U. BRIGHT.
POISON DISTRIBUTER.
APPLICATION FILED FEB. 26, 1919.
1,321,360.
Patented Nov. 11, 1919.
2 SHEETS—SHEET 1.
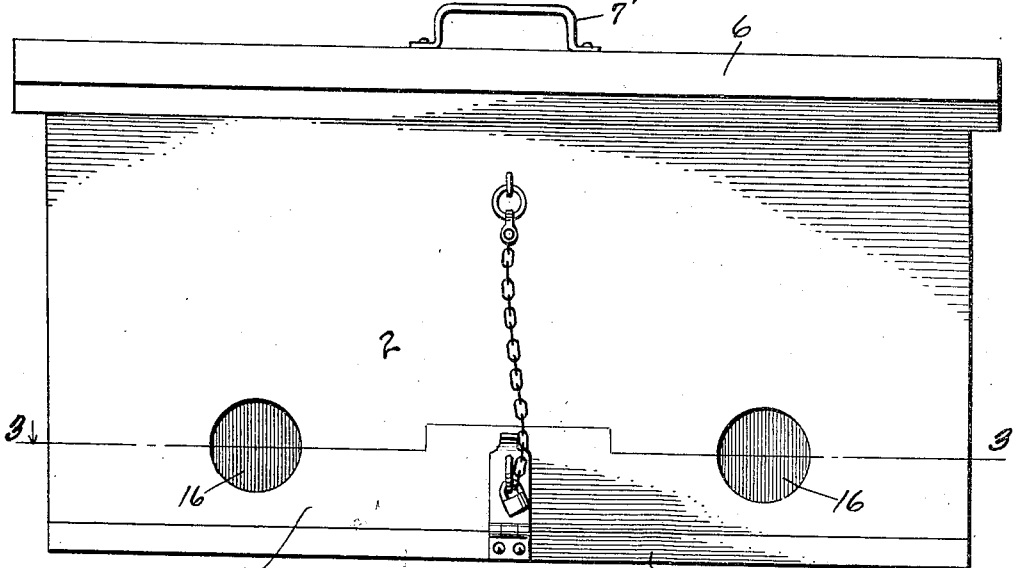
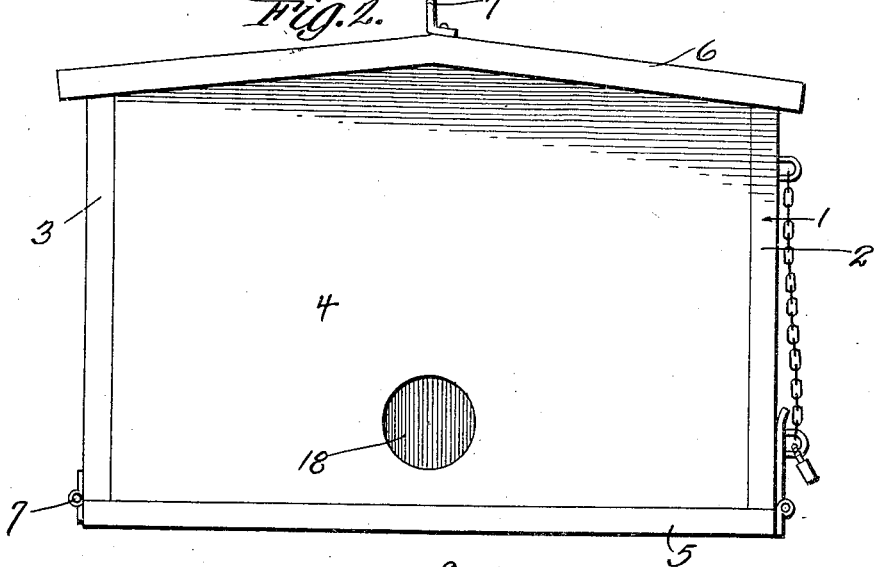
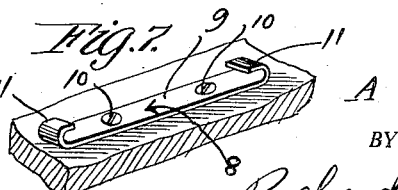
WITNESS:
INVENTOR.
U. Bright
BY
ATTORNEY.

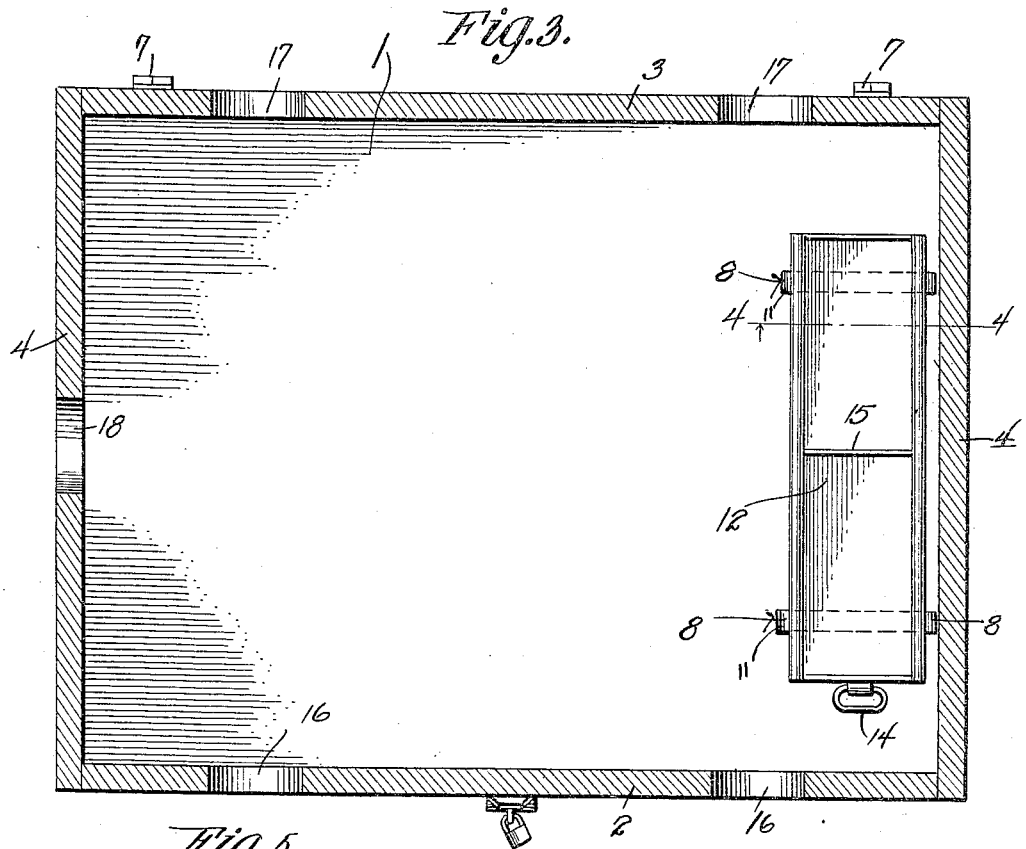
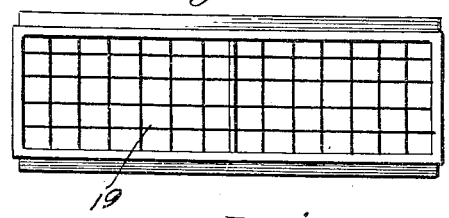
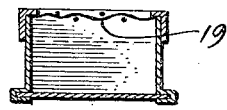
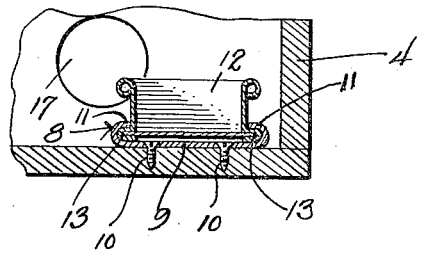

UNITED STATES PATENT OFFICE.

ALLEN U. BRIGHT, OF HOWARD, KANSAS.

POISON-DISTRIBUTER.

1,321,360.  Specification of Letters Patent.  Patented Nov. 11, 1919.

Application filed February 26, 1919. Serial No. 279,296.

*To all whom it may concern:*

Be it known that I, ALLEN U. BRIGHT, a citizen of the United States, residing at Howard, in the county of Elk and State of Kansas, have invented certain new and useful Improvements in Poison-Distributers, of which the following is a specification.

This invention relates to poison distributers and more particularly to an apparatus which may be placed in houses, cellars, barns, corn cribs and similar places where rodents may be found, so that the rodents may find ready access to the poison bait while small domestic animals and fowls will be prevented from gaining access to the poison.

Another object of the invention is to provide a housing within which the poison is contained, the structure of the housing being arranged so that the rodents will not hesitate about entering to gain access to the poison.

A further object of the invention is to provide a device of this character which consists of comparatively few parts and is simple in construction but durable and well adapted to withstand the rough usage to which devices of this character are ordinarily subjected.

For a full description of the invention and the advantages and merits thereof, reference is to be had to the following description and accompanying drawings, in which:—

Figure 1 is a front elevation of the device constructed in accordance with my invention, Fig. 2 is an end elevation thereof, Fig. 3 is a horizontal section taken on the line 3—3 of Fig. 1.

Fig. 4 is a fragmentary section taken on the line 4—4 of Fig. 3.

Fig. 5 is a plan view of a modified form of poison container.

Fig. 6 is a transverse section through the same.

Fig. 7 is a detail perspective view of one of the poison container supports.

Referring to the drawings, wherein is illustrated the preferred form of my invention, in which like numerals of reference indicate like or corresponding parts throughout the several views, the housing 1 is preferably constructed of rectangular formation having the front wall 2 and the rear wall 3 and the end walls 4. The bottom of floor 5 of the housing is hingedly connected as at 7 at its rear marginal edge to the lower edge of the rear wall 3 and the top of the housing is provided with a roof or cover 6 having a handle 7' attached thereto whereby the device may be readily carried from place to place. The four walls being fastened together and having the roof or cover 6 mounted thereon it will be obvious that the hinges 7 will permit the top structure to be swung to one side so that the entire surface of the floor 5 may be exposed. Attached to the floor 5 near one of the end edges thereof is a pair of fastening elements or cleats 8 one of which is shown in detail in Fig. 7. The straight portion 9 is fixed by screw 10 to the floor and each end is curved upon itself to form a curved tongue 11. These cleats or fastening elements are longitudinally spaced apart as shown to advantage in Fig. 3. The poison container 12 is in the form of a rectangular receptacle having its bottom provided with longitudinally extending flanges 13 adapted to be engaged by the tongues 11 of the fastening elements 8 and one end of the poison receptacle is provided with a finger ring 14 whereby the receptacle may be longitudinally slid into or out of engagement with the cleats. When in operative position it will be obvious that the receptacle 12 cannot be withdrawn from the cleats until the top structure of the housing is raised above the floor as it is impossible to slide the receptacle out from engagement with the cleats when the side walls 2 and 3 are down in position shown in Fig. 3 of the drawing. This arrangement will prevent the rodents from pulling the receptacle 12 away from its position at the end of the housing. A transverse partition 15 is provided in the receptacle so that the two compartments are provided one of which may contain poisoned grain or the like while the other contains water. The front wall 2 is provided with apertures or inlets 16 while the rear wall 3 is also provided with similar passages 17 and it will be noted that these openings are in alinement so that as the rodent approaches one of the openings 16 the other or outlet opening 17 will immediately appear and the rodent will be encouraged to enter the housing as it will be noted that they will more readily enter an inclosure in which they can observe another exit. The center of the end wall 4, at the end opposite to that in which the receptacle is mounted is also provided with an inlet opening 18 and it will be obvious that the rodent approaching this opening will also observe the openings 16 and 17 and will therefore readily enter. The openings 16, 17 and 18 are of a size sufficient to admit the ordinary small rodent but not large enough to admit chickens, small domestic animals or the hands of small children. The poison is thereby obtained, only by the rodents when entering the housing.

A locking device is provided on the front wall whereby the hingedly mounted top cover may be locked securely to the forward marginal edge of the flooring after the poison has been placed in the receptacle.

In Figs. 5 and 6 I have illustrated a slightly modified form of poison receptacle and the same includes a screen 19 stretched across the top of the receptacle the screen being of a very coarse mesh so that the rodents may secure bits of the poison but cannot pull all of the same out of the receptacle. This structure is especially desirable where poisoned meat is used as a bait, and it will be obvious that the rodents will secure small pieces of the meat but it will be impossible to pull larger pieces through the screen 19 and consequently none of the poison can be removed from the housing except that which has been eaten.

The foregoing description and accompanying drawings have reference to what might be considered to be the approved or preferred form of my invention. I desire it to be understood that I may make such changes in the construction, combination and arrangements of parts, materials, dimensions, et cetera, as may prove expedient and fall within the scope of the appended claims.

Having thus fully described my invention what I claim as new and desire to secure by Letters Patent, is:—

1. A poison distributer comprising a flooring, a hingedly mounted housing structure mounted on the flooring and adapted to swing upwardly to open the housing, and a receptacle mounted on the flooring and slidably engaged therewith whereby removing of the receptacle is prevented when the hinged housing structure is closed.

2. A poison distributer comprising a flooring, a housing structure mounted on the flooring and adapted to swing outwardly therefrom, the said flooring being provided with cleats, and a removable receptacle slidably attached to the cleats and of a length slightly less than the width of the housing whereby the receptacle cannot be slidably removed from the cleats when the said housing is closed and in engagement with the flooring.

3. A poison receptacle comprising a housing, including walls, and a top cover, a bottom flooring hingedly connected to one of the walls, whereby the housing may be swung upwardly away from the flooring, the walls having openings provided therein, a pair of cleats attached to the flooring near one end thereof at points remote from the said openings in the walls, and a receptacle attached to the cleats and removably mounted thereon whereby the receptacle may be removed when the said hingedly mounted housing is opened.

In testimony whereof I affix my signature in presence of two witnesses.

ALLEN U. BRIGHT.

Witnesses:
J. R. BEACH,
F. C. FLORY.

Copies of this patent may be obtained for five cents each, by addressing the "Commissioner of Patents, Washington, D. C."